United States Patent
Satpute et al.

(10) Patent No.: US 11,257,097 B2
(45) Date of Patent: Feb. 22, 2022

(54) METHODS AND SYSTEMS FOR SECURE PRODUCT ACTIVATION

(71) Applicant: MASTERCARD INTERNATIONAL INCORPORATED, Purchase, NY (US)

(72) Inventors: Rupesh Satpute, Maharashtra (IN); Deepti Dhapola, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 105 days.

(21) Appl. No.: 16/400,258

(22) Filed: May 1, 2019

(65) Prior Publication Data
US 2019/0347669 A1 Nov. 14, 2019

(30) Foreign Application Priority Data
May 8, 2018 (IN) .............................. 201811017357

(51) Int. Cl.
*G06Q 30/00* (2012.01)
*G06Q 30/06* (2012.01)
*H04L 29/06* (2006.01)
*H04W 12/126* (2021.01)

(52) U.S. Cl.
CPC ....... *G06Q 30/018* (2013.01); *G06Q 30/0635* (2013.01); *H04L 63/126* (2013.01); *H04W 12/126* (2021.01)

(58) Field of Classification Search
CPC .............. G06Q 30/018; G06Q 30/0635; H04L 63/126; H04W 12/1206
USPC ...................................................... 705/26.81
See application file for complete search history.

(56) References Cited

U.S. PATENT DOCUMENTS

| 7,260,382 B1* | 8/2007 | Lamb ................ H04M 1/72406 455/411 |
| 7,774,829 B2* | 8/2010 | Waltermann ............ G06F 21/31 726/6 |
| 2005/0102624 A1* | 5/2005 | McIntyre ................ G06T 11/60 715/723 |
| 2007/0043677 A1* | 2/2007 | Drapkin ............. G06Q 20/3829 705/52 |
| 2009/0049542 A1* | 2/2009 | DeYonker ............... G06F 21/10 726/18 |

(Continued)

FOREIGN PATENT DOCUMENTS

EP    2079256 A1 *   7/2009   ............ H04W 8/245

OTHER PUBLICATIONS

Software activation, 2008, Palisade Software (Year: 2008).*

(Continued)

*Primary Examiner* — Brittney N Miller
*Assistant Examiner* — Thomas Joseph Sullivan
(74) *Attorney, Agent, or Firm* — Armstrong Teasdale LLP

(57) ABSTRACT

The present disclosure relates to product activation of products purchased online or through electronic commerce platforms. The disclosure provides methods, systems, and computer program products that enable secure activation of products using user identity data. The disclosure implements secure activation based on activation records maintained in an activation server and a unique registrant ID corresponding to an intended user of the product that is generated and maintained at an identity verification platform.

17 Claims, 16 Drawing Sheets

(56) References Cited

U.S. PATENT DOCUMENTS

| | | | | |
|---|---|---|---|---|
| 2009/0327091 A1* | 12/2009 | Hartin | .................. | G06F 21/121 |
| | | | | 705/26.1 |
| 2012/0144502 A1* | 6/2012 | Smith | .................. | G06F 21/105 |
| | | | | 726/30 |
| 2014/0020073 A1* | 1/2014 | Ronda | ..................... | G06F 21/44 |
| | | | | 726/7 |
| 2014/0052557 A1* | 2/2014 | Biswas | .................. | G06F 21/10 |
| | | | | 705/26.1 |
| 2015/0213238 A1* | 7/2015 | Farha | .................. | H04L 63/101 |
| | | | | 726/30 |
| 2018/0307812 A1* | 10/2018 | Boldin | .................... | G06F 21/31 |
| 2019/0123980 A1* | 4/2019 | Singh | ................. | H04L 41/5064 |

OTHER PUBLICATIONS

Studio One 2 SoftwareActivation (Online Computer), Jun. 14, 2013, PreSonus software (Year: 2013).*

How to check Windows 10 Product Key on your computer, Aug. 7, 2016, cocosenor.com (Year: 2016).*

Huculak, Mauro, "How to link your Windows 10 product key to a Microsoft account", Sep. 7, 2016, Windows Central (Year: 2016).*

* cited by examiner

METHODS AND SYSTEMS FOR SECURE PRODUCT ACTIVATION

CROSS REFERENCE TO RELATED APPLICATIONS

This patent application claims priority to Indian Patent Application No. 201811017357 filed on May 8, 2018, the disclosure of which is incorporated by reference herein in its entirety as part of the present application.

BACKGROUND

The present disclosure relates to product activation of products purchased online or through electronic commerce platforms. In particular, the disclosure provides methods, systems, and computer program products that enable secure activation of products using user identity data.

The increasing use of electronic commerce and online platforms to purchase products has commensurately given rise to the phenomenon where purchased products are dispatched from a retailer to a purchaser, but are stolen, misdelivered, or otherwise misappropriated en route. While mobile devices are particularly easy targets for such theft/misappropriation, other hardware and software products are equally susceptible.

FIG. 1 illustrates a retail environment 100 within which conventional online purchases are typically carried out. An online purchase transaction may be carried out using a client terminal 102 communicating with a merchant server 106 through communication network 104 (for example, the internet). Once the purchase transaction is concluded, the online merchant server transmits instructions for the purchased product to be delivered from warehouse 108 via one or more logistics service providers 110 to recipient 112. The existence of multiple transition hubs between dispatch from warehouse 108 and delivery to recipient 112, as well as the use of independent third party warehousing and logistics agents (who in turn may have sub-contracted one or more delivery responsibilities to other agents) creates several opportunities for theft, misappropriation, or misdelivery of purchased product(s).

There is accordingly a need for a solution that prevents purchased products from being activated or used by persons other than the originally intended user/recipient with a view to ensure that misdelivered or misappropriated products cannot be used by unauthorized parties. The objective is to reduce incentives for theft or misappropriation, and to increase incentives for return of any misdelivered products.

BRIEF DESCRIPTION

The disclosure provides methods, systems, and computer program products that enable secure activation of products using user identity data.

In one embodiment, the disclosure includes a method for identity based product activation, the method including (i) receiving at a merchant server, (a) an instruction for purchase of a product, and (b) a unique registrant ID corresponding to an intended user of the product, wherein said unique registrant ID uniquely identifies an identity data record maintained by an identity verification platform and that corresponds to the intended user of the product, (ii) generating an activation data record at an activation server, said activation data record including the received unique registrant ID, and a unique product ID corresponding to the product, (iii) responsive to receiving an activation input through the product, (c) receiving user input defining a user ID corresponding to a user operating the product, (d) receiving at least one additional item of user identity data corresponding to said user, (e) transmitting to the activation server, the unique product ID corresponding to the product, the user ID, and the at least one additional item of user identity data, (f) responsive to a determination that the user ID and the unique product ID respectively match a unique registrant ID and a unique product ID that have been associated with each other within an activation data record generated by the activation server, transmitting a verification request to the identity verification platform, said verification request including the user ID and the received at least one additional item of user identity data, (iv) responsive to determining that the user ID and the at least one additional item of user identity data respectively match a unique registrant ID and an item of user identity data that have been associated with each other in an identity data record maintained by the identity verification platform, transmitting an identity confirmation to the activation server, and (v) responsive to receiving identity confirmation at the activation server, transmitting a product activation instruction from the activation server.

The at least one additional item of user identity data may include data corresponding to any one or more of a name, a date of birth, biometric data, a password, a personal identification number, or payment card data.

The identity verification platform may be configured to associate each unique registrant ID that is maintained by said identity verification platform, with at least one item of biometric data corresponding to an individual with whom said unique registrant ID is associated.

In an embodiment of the method, a product activation process is implemented at the product in response to receipt of the product activation instruction transmitted from the activation server.

Further, the instruction for purchase of the product may be generated by a first individual, wherein the intended user of the product is a second individual different from the first individual.

The product may be a physical product that is physically delivered to the intended user subsequent to purchase and prior to receiving the activation input through said product.

In a specific embodiment of the method, (i) the unique registrant ID is an aadhar number issued under Unique Identification Authority of India, (ii) the at least one other item of user identity data is payment card data, and/or (iii) the purchased product is a mobile communication device.

The disclosure also provides a method for identity based product activation of a product purchased through a merchant server, wherein purchase of said product includes the steps of (i) receiving at the merchant server, (a) an instruction for purchase of the product, and (b) a unique registrant ID corresponding to an intended user of the product, wherein said unique registrant ID uniquely identifies an identity data record maintained by an identity verification platform and corresponding to the intended user of the product, and (ii) generating an activation data record at an activation server, said activation data record including the received unique registrant ID, and a unique product ID corresponding to the product.

The method for identity based product activation includes (i) receiving at the activation server, data communicated from the product, wherein the received data includes (a) the unique product ID corresponding to the product, (b) a user ID corresponding to a user operating the product, wherein said user ID is defined by user input received through the product, and (c) at least one additional item of user identity data corresponding to said user, (ii) responsive to determining that the user ID and the unique product ID respectively match a unique registrant ID and a unique product ID that have been associated with each other within an activation data record generated by the activation server, transmitting a verification request to the identity verification platform, said verification request including the user ID and the received at least one additional item of user identity data, and (iii) responsive to receiving an identity confirmation from the identity verification platform, transmitting a product activation instruction from the activation server to the product, wherein said identity confirmation is received at the activation server in response to a determination that the user ID and the at least one additional item of user identity data respectively match a registrant ID and an item of user identity data that have been associated with each other in an identity data record maintained by the identity verification platform.

In a method embodiment, the at least one additional item of user identity data includes data corresponding to any one or more of a name, date of birth, biometric data, a password, a personal identification number, or payment card data.

The identity verification platform may be configured to associate each unique registrant ID that is maintained by said identity verification platform, with at least one item of biometric data corresponding to an individual with whom said unique registrant ID is associated.

The product activation instruction may be configured to initiate a product activation process at the product.

The instruction for purchase of the product is in an embodiment, generated by a first individual and the intended user of the product is a second individual different from the first individual.

The product may be a physical product that is physically delivered to the intended user subsequent to purchase and prior to receiving the activation input through said product.

In various embodiments, (i) the unique registrant ID may include an aadhar number issued under Unique Identification Authority of India, (ii) the at least one other item of user identity data is payment card data, and (iii) the purchased product is a mobile communication device.

The disclosure additionally presents a system for identity based product activation. The system includes (i) a merchant server including a processor configured for receiving through a communication interface (a) an instruction for purchase of a product, and (b) a unique registrant ID corresponding to an intended user of the product, wherein said unique registrant ID uniquely identifies an identity data record maintained by an identity verification platform that corresponds to the intended user of the product, and (ii) an activation server including (c) a processor configured for generating an activation data record, said activation data record including the received unique registrant ID, and a unique product ID corresponding to the product, (d) a communication interface configured for (1) receiving data communicated from the product, wherein the received data includes (A) the unique product ID corresponding to the product, (B) a user ID corresponding to a user operating the product, wherein said user ID is defined by user input received through the product, and (C) at least one additional item of user identity data corresponding to said user, (2) responsive to a determination that the user ID and the unique product ID respectively match a unique registrant ID and a unique product ID that have been associated with each other within an activation data record generated by the activation server, transmitting a verification request to the identity verification platform, said verification request including the user ID and the received at least one additional item of user identity data, and (3) responsive to receiving an identity confirmation at the activation server, transmitting a product activation instruction from the activation server to the product, wherein an identity confirmation is received at the activation server in response to a determination that the user ID and the at least one additional item of user identity data respectively match a registrant ID and an item of user identity data that have been associated with each other in an identity data record maintained by the identity verification platform.

In an embodiment of the system the at least one additional item of user identity data includes data corresponding to any one or more of a name, date of birth, biometric data, a password, a personal identification number, or payment card data.

The identity verification platform may be configured to associate each unique registrant ID that is maintained by said identity verification platform, with at least one item of biometric data corresponding to an individual with whom said unique registrant ID is associated.

The product activation instruction may be configured to initiate a product activation process at the product.

In a specific embodiment of the system, an instruction for purchase of the product is generated by a first individual and the intended user of the product is a second individual different from the first individual.

The product under purchase through the system may in an embodiment include a physical product that is physically delivered to the intended user subsequent to purchase and prior to receiving the activation input through said product.

In various system embodiments, the unique registrant ID is an aadhar number issued under Unique Identification Authority of India, the at least one other item of user identity data is payment card data, and/or the purchased product is a mobile communication device.

The disclosure also provides an activation server configured for identity based product activation of a product purchased at a merchant server, wherein purchase of said product includes the steps of (i) receiving at the merchant server, (a) an instruction for purchase of the product, and (b) a unique registrant ID corresponding to an intended user of the product, wherein said unique registrant ID uniquely identifies an identity data record maintained by an identity verification platform and corresponding to the intended user of the product, and (ii) generating an activation data record at an activation server, said activation data record including the received unique registrant ID, and a unique product ID corresponding to the product.

The activation server includes at least one processor configured for (i) receiving data communicated from the product, wherein the received data includes, (a) the unique product ID corresponding to the product, (b) a user ID corresponding to a user operating the product, wherein said user ID is defined by user input received through the product, and (c) at least one additional item of user identity data corresponding to said user, (ii) responsive to determining that the user ID and the unique product ID respectively match a unique registrant ID and a unique product ID that have been associated with each other within an activation data record generated by the activation server, transmitting a verification request to the identity verification platform, said verification request including the user ID and the received at least one additional item of user identity data, and (iii) responsive to receiving an identity confirmation, transmitting a product activation instruction from the activation server to the product, wherein an identity confirmation is received at the processor in response to a determination that the user ID and the at least one additional item of user identity data respectively match a registrant ID and an item of user identity data that have been associated with each other in an identity data record maintained by the identity verification platform.

In this embodiment, the at least one additional item of user identity data may include data corresponding to any one or more of a name, date of birth, biometric data, a password, a personal identification number, or payment card data.

The identity verification platform may be configured to associate each unique registrant ID that is maintained by said identity verification platform, with at least one item of biometric data corresponding to an individual with whom said unique registrant ID is associated.

The product activation instruction may be configured to initiate a product activation process at the product.

In a system embodiment, the instruction for purchase of the product is generated by a first individual and the intended user of the product is a second individual different from the first individual.

In one embodiment involving the activation server, the product is a physical product that is physically delivered to the intended user subsequent to purchase and prior to receiving the activation input through said product.

In a further embodiment involving the activation server, (i) the unique registrant ID is an aadhar number issued under Unique Identification Authority of India, (ii) the at least one other item of user identity data is payment card data, and (iii) the purchased product is a mobile communication device.

DETAILED DESCRIPTION

The present disclosure provides novel and inventive systems, methods, and computer programs for implementing product activation solutions for products purchased online or through electronic retail platforms.

Figure 1:
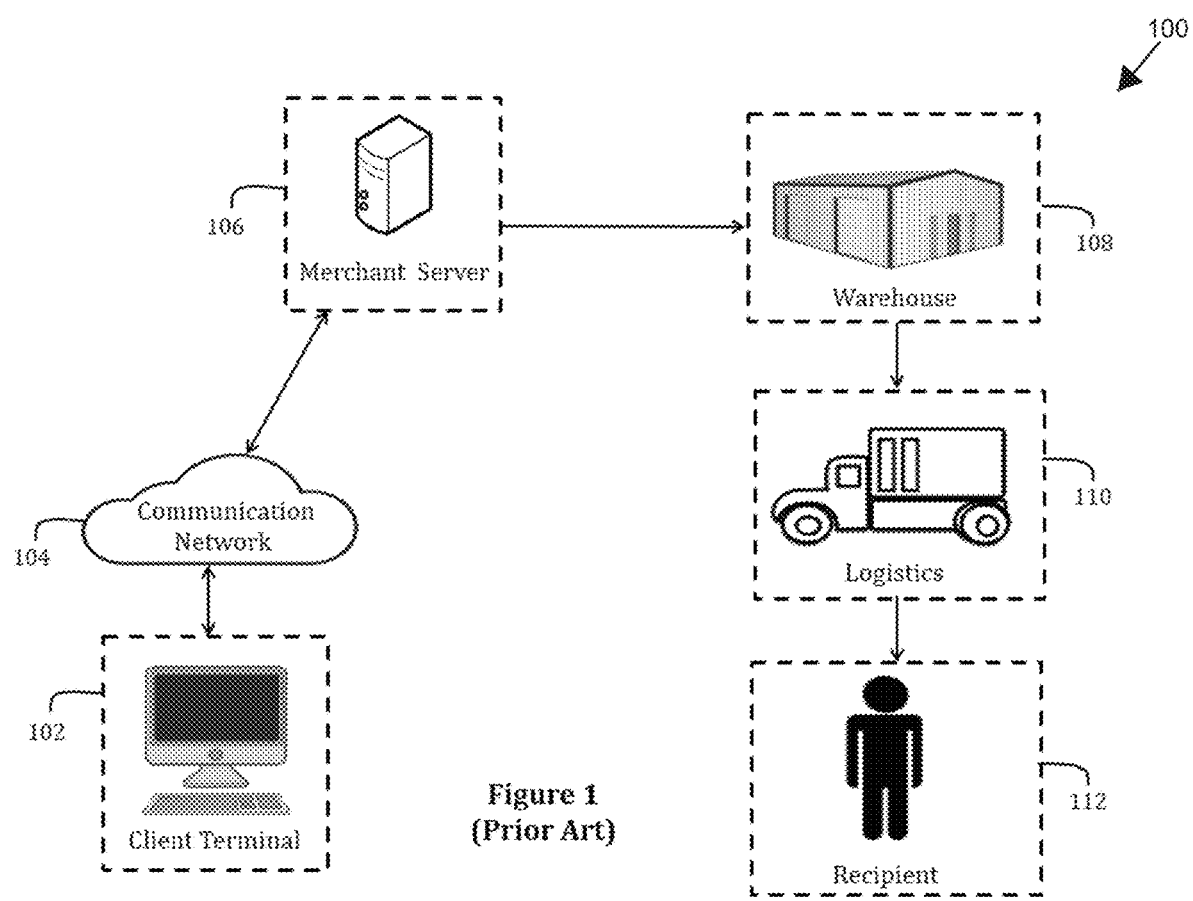
FIG. 1 illustrates an environment within which conventional online purchases and delivery of such purchases are typically carried out.
Figure 2:
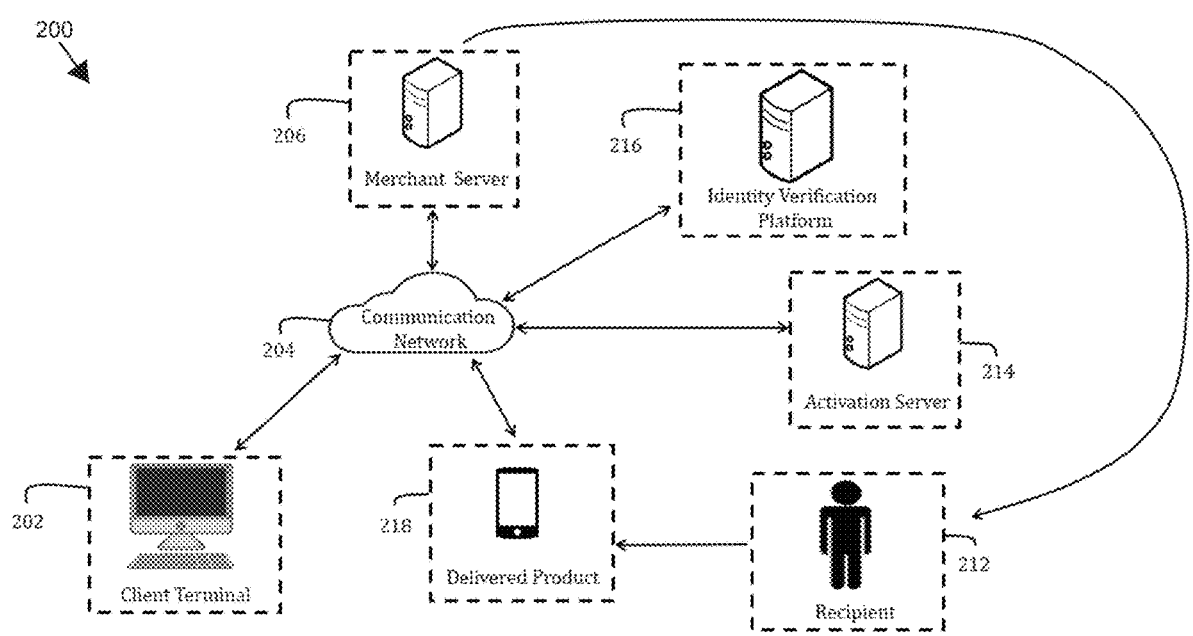
FIG. 2 illustrates a system for performing online product purchases that enables implementation of a product activation based security feature, in accordance with an embodiment of present disclosure.

FIG. 2 illustrates a system 200 configured to enable implementation of one or more of the disclosure embodiments described in more detail hereunder. A brief description of system 200 is provided hereinbelow, while further details of the operations/functionality/interoperability of various system components are provided in the descriptions concerning the subsequent figures.

System 200 is a system configured to enable execution of an online purchase transaction having identity based product activation. The system includes client terminal 202 in network communication with merchant server 206 through communication network 204.

Execution of an online purchase transaction through system 200 includes (i) identification of an intended user/intended recipient of the purchased product, at the time of purchase and (ii) associating a unique identifier corresponding to the intended user/intended recipient 212 of the purchased product with a unique identifier corresponding to the purchased product. Said association may be generated and may be recorded by activation server 214, which activation server 214 is communicably coupled to merchant server 206 through communication network 204. In an embodiment merchant server 206 may include one or more of a processor, memory, and network communication interface, and may additionally be communicably coupled with an internal or external storage database.

It would be understood that in certain embodiments, the intended user/intended recipient 212 of the purchased product may be the purchaser carrying out the purchase transaction through client terminal 202. In alternative embodiments, the purchaser carrying out the purchase transaction through client terminal 202 is a first individual and the intended user/intended recipient 212 of the purchased product is a second individual who is different from the first individual.

Once the purchase transaction is concluded, merchant server 206 initiates delivery of the product 218 to the intended recipient 212 via one or more warehousing or logistics service providers (not shown in FIG. 2).

The delivered product 218 is configured such that it necessarily requires successful completion of a product activation process before it can be used. In an embodiment, the delivered product 218 is delivered in an inoperable/partially inoperable state, wherein the product activation process necessarily requires to be completed to change the state of the delivered product from an inoperable/partially inoperable state to an operable/fully operable state. In specific embodiments of the disclosure, the product activation process includes the steps of (i) authenticating the identity of an actual recipient 212 of the delivered product 218 to ascertain whether actual recipient 212 is the intended user/intended recipient (as recorded at activation server 214 at the time of purchase) of the delivered product 218, and (ii) responsive to confirmation that the actual recipient 212 of the delivered product 218 is in fact the intended user/intended recipient of the delivered product 218, system 200 implements product activation steps to change the state of the delivered product from an inoperable/partially inoperable state to an operable/fully operable state.

It would be understood that the teachings of the present disclosure may be successfully applied to any product that incorporates a processing device as well as a network communication device and which can therefore be configured for activation in accordance with the teachings of the present disclosure. In certain embodiments of the disclosure, delivered product 218 may additionally incorporate one or more sensors capable of scanning and/or processing biometric feature(s) of a user.

Without limitation, examples of products 218 to which the teachings of the present disclosure can be applied include servers, desktops, laptops, tablets, smart phones, mobile phones, mobile communication devices, tablets, phablets and personal digital assistants, smart televisions, IOT (internet of things) devices, cars or other transport or carrier vehicles, any household goods, electrical or electronic goods, or FMCE (fast moving consumer electronics) goods that incorporate data processing capabilities and network communication capabilities, and which in preferred embodiments preferably also incorporate biometric feature scanning and/or processing capabilities.

In an embodiment of the disclosure, product 218 may alternatively include a software product configured for installation/operation on any hardware device that incorporates data processing capabilities and network communication capabilities, and in an example embodiment that may also incorporate biometric feature scanning and/or processing capabilities.

The product 218 may be configured such that responsive to receiving user input for initiating operation of said product 218 (for example, in response to the product being switched on or operated for the first time), processing device implementable instructions incorporated within said product initiate a product activation process or subroutine.

In an embodiment of the disclosure, said processing device implementable instructions may be implemented within operating system (OS) software within product 218 (where the product is a hardware product). In an embodiment where product 218 is a software product, the processing device implementable instructions may either include a part of the software product itself, or may alternatively include one or more executable software files or library software files that the software product is configured to communicate with. In a specific embodiment, the product may be configured so as to prevent operation of the product unless a product activation process in accordance with the teachings of the present disclosure has been successfully completed.

The product activation process or subroutine is configured to initiate network communication between product 218 and activation server 214 via communication network 204. Activation server 214 is in turn in communication with an identity verification platform 216, which identity verification platform (as discussed in more detail) includes at least one data record corresponding to the intended user/intended recipient of product 218. Said data record includes (i) a unique identifier corresponding to the intended recipient/intended user of the device (ii) one or more items of identity data corresponding to said intended recipient/intended user of the device and (iii) an association recorded between (i) and (ii). Subject to an actual recipient/actual user of the delivered product being able to successfully submit both of (i) the unique identifier corresponding to said intended recipient/intended user of the device and (ii) the one or more items of identity data corresponding to said intended recipient/user of the device, to the identity verification platform through the activation server (in the course of the product activation process), said identity verification platform confirms that the user operating product 218 is in fact the intended recipient/intended user of product 218, and communicates such confirmation to activation server 214.

Responsive to receiving confirmation that a user seeking activation of product 218 is in fact the intended user/intended recipient that was specified at the time of purchase of said product, activation server 214 communicates an activation instruction to product 218 which triggers activation and enables subsequent use of such product.

Figure 3A:
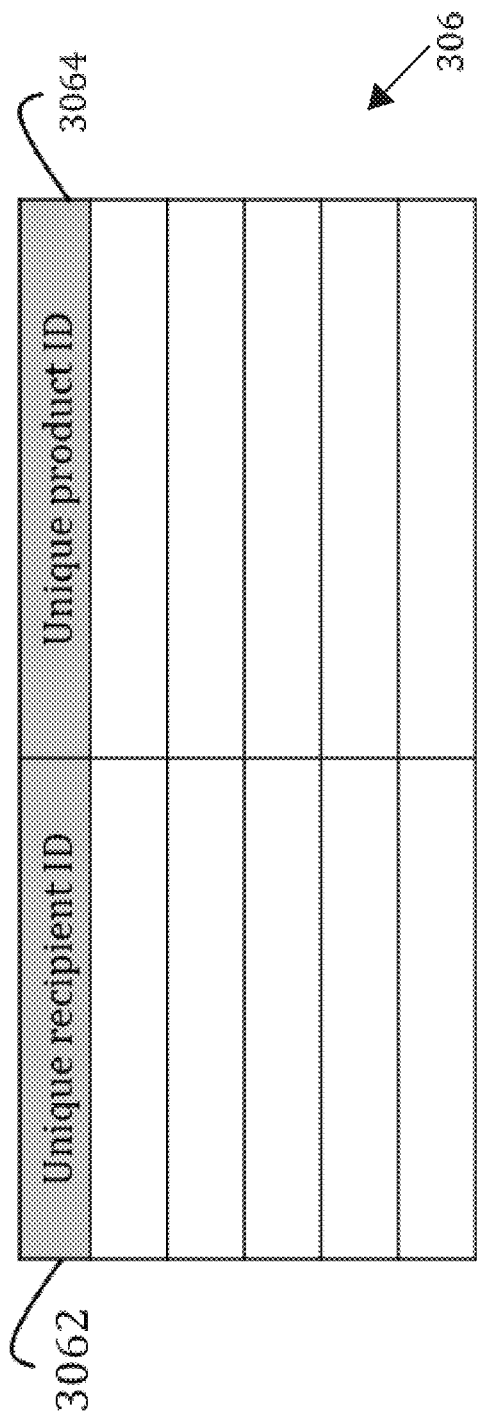
FIG. 3A illustrates a data record schema of a type that may be implemented within an activation server of the type illustrated in FIG. 2, in accordance with an embodiment of present disclosure.

Activation server 214 may include any server configuration having access to internal or external database storage. In an embodiment, activation server 214 may include at least one processor, and one or more transitory and/or non-transitory memories. As discussed above, activation server 214 may be configured to generate and store activation server data records, each such data record including (i) a unique identifier corresponding to an intended user/intended recipient of a purchased product and (ii) a unique identifier corresponding to the purchased product itself. Activation server 214 may be controller, operated, or managed by any one of several entities, including one or more of the merchant, an e-commerce platform through which the product is being purchased, the manufacturer of the product under purchase, a payment network or a payment intermediary (for example Mastercard® or Visa®) that is used to implement the payment transaction involved in the purchase, or any other trusted intermediary capable of provided the necessary activation services. FIG. 3A illustrates an exemplary data record schema 306 of a type that is capable of being used for implementing the desired configuration and functionality of activation server 214.

Exemplary data record schema 306 includes first data field 3062 configured to record a unique recipient ID, which unique recipient ID includes a unique identifier that identifies an intended user/intended recipient of a purchased product 218. In one embodiment of the disclosure, said unique recipient ID may include identity information that is capable of uniquely identifying an individual. Exemplary non-limiting examples of identifiers that may be used as a unique recipient ID are an individual's passport number, social security number, aadhar number (i.e., a unique identity number allocated by the Unique Identification Authority of India (UIDAI), Government of India), voter ID number, ration card number, driver's license number, and permanent account number (PAN). In an embodiment of the disclosure, the unique recipient ID used to generate activation data records by activation server 214 are unique registrant IDs that have been generated by and recorded at identity verification platform 216 (and which are discussed in more detail in connection with FIG. 3C below).

Exemplary data record schema 306 also includes second data field 306*d* configured to record a unique product ID, which unique product ID includes a unique identifier corresponding to a purchased product. In an embodiment of the disclosure, said unique product ID may include an identifier that is capable of uniquely identifying a purchased product. Exemplary non-limiting examples of identifiers that may be used as a unique product ID are a product serial number, an International Mobile Equipment Identity (IMEI) number (where the product in question is a mobile phone or mobile device), or any other unique serial number that is required to be associated with a product either by convention, trade practice or applicable law or regulation.

Figure 3B:
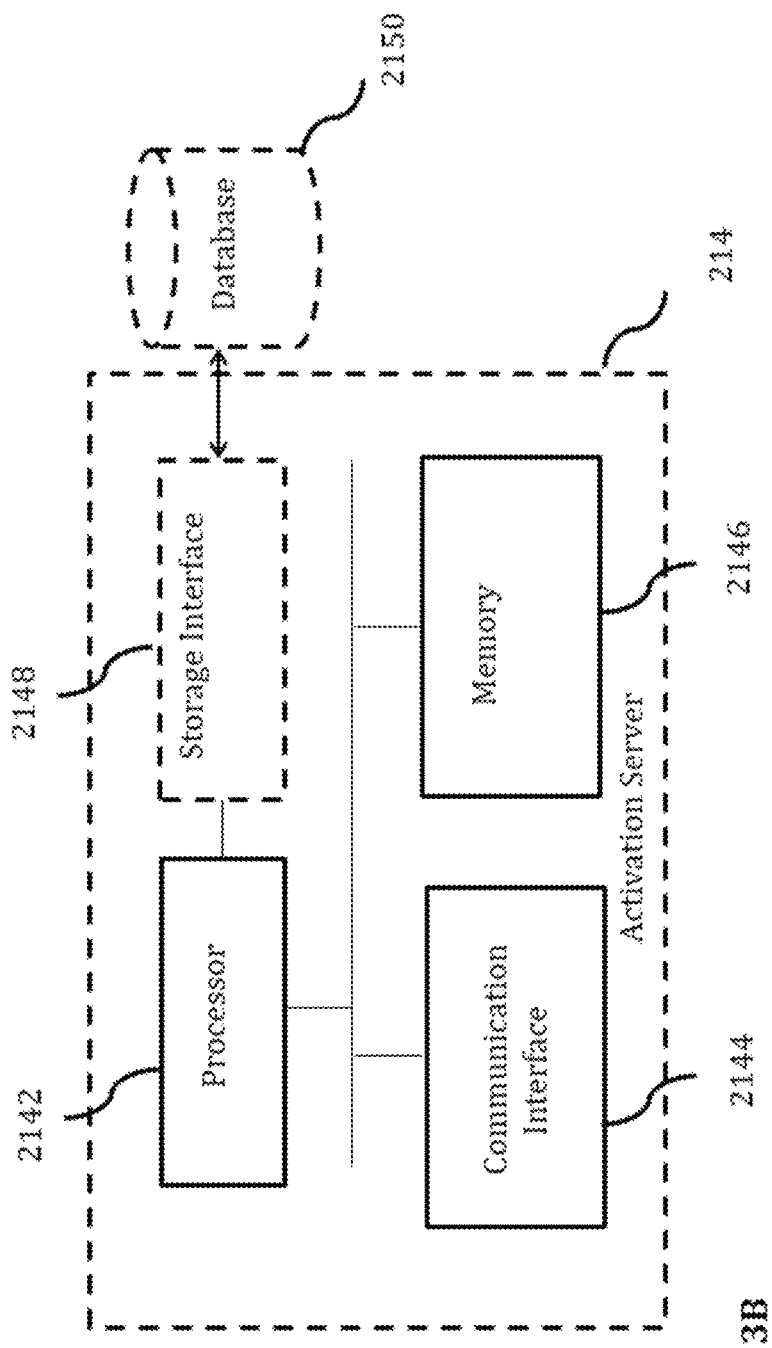
FIG. 3B is a simplified block diagram of an activation server of the type illustrated in FIG. 2, in accordance with an embodiment of present disclosure.

FIG. 3B is a simplified block diagram of an embodiment of an activation server 214 of the type illustrated in FIG. 2. Activation server 214 includes at least one processor 2142 for executing instructions. Said instructions may be stored in memory 2146. Processor 2142 may include one or more processing units. The processor 2142 may be communicably coupled with communication interface 2144 such that activation server 214 is enabled for communication with any electronic device having network communication capabilities (e.g., with any one or more of client terminal 202, merchant server 206, or identity verification platform 216) or with any entity connected to communication network 204.

Processor 2142 may additionally be communicably coupled to database 2150, which database 2150 includes one or more non-transient memory devices configured for storing and retrieving data, which data includes data of the type stored in activation server data records of the type discussed in connection with FIG. 3A. Database 2150 may include multiple storage units such as hard disks or sold state disks in a redundant array of inexpensive disks (RAID) configuration. Database 2150 may also include a storage area network and/or a network attached storage (NAS) system.

In some embodiments database 2150 may be integrated within activation server 214 and in other embodiments may be external to said activation server 214 and may be accessed by the activation server 214 through storage interface 2148. Storage interface 2148 may include for example, any of an Advanced Technology Attachment (ATA) adapter, a Serial ATA (SATA) adapter, a network adapter, or any other component providing processor 2142 with access to database 2150.

Figure 3C:
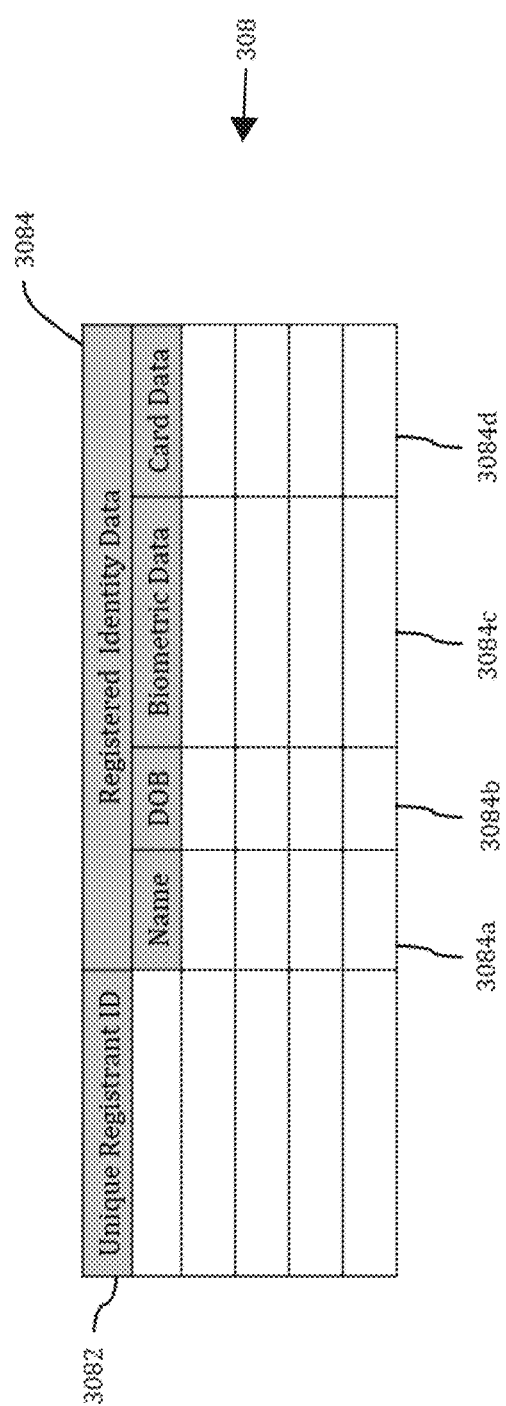
FIG. 3C illustrates a data record schema of a type that may be implemented within an identity verification platform of the type illustrated in FIG. 2, in accordance with an embodiment of present disclosure.

FIG. 3C illustrates an exemplary data record schema 308 of a type that is capable of being used for implementing the desired configuration and functionality of identity verification platform 316. In the illustrated embodiment, each data record includes at least a first data field 308*a* for storing a unique registrant ID including a unique ID corresponding to each individual registered with said identity verification platform. In an embodiment of the disclosure, said unique registrant ID may include an identifier that is capable of uniquely identifying an individual. Exemplary non-limiting examples of identifiers that may be used as a unique recipient ID are an individual's passport number, social security number, aadhar number (i.e., a unique identity number allocated by the Unique Identification Authority of India (UIDAI), Government of India), voter ID number, ration card number, driver's license number, and permanent account number (PAN). In an example embodiment, the identity verification platform is configured to associate each unique registrant ID that is maintained by said identity verification platform with at least one item of biometric data corresponding to an individual with whom said unique registrant ID is associated.

It would be understood that certain types of identifiers that may be used as a unique recipient ID may be "protected identifiers"—i.e., identifiers that are statutorily regulated under applicable data privacy laws or other regulations that prohibit storage of said identifiers by any third party. An example of identifiers of this type would be aadhar numbers issued by the Government of India under the UIDAI project. In such situations, the unique identifier that is used as the unique registrant ID may include any other "alias identifier" that is unique to the concerned individual, and which has been associated with said individual's protected identifier in the appropriate government controlled database. In such situations, access to the individual's protected identifier and data records associated with such identifier may be made available through an interface gateway (for example one or more APIs) to the database at which records associated with the protected identifier are maintained, which interface gateway enables records corresponding to the individual's protected identifier to be requested/retrieved from the appropriate database by forwarding said individual's alias identifier to said interface gateway with an appropriate request for data retrieval and/or identity verification. Continuing with the example where the protected identifier is an individual's aadhar number, such numbers are mandatorily associated in the UIDAI database with a mobile phone number associated with the registered individual. Accordingly, the individual's mobile number can in such cases serve as the alias identifier provided by the individual as her/his unique registrant ID and which mobile number may be used to identify said individual's aadhar number and data records associated with said aadhar number by communicating an appropriate data message or API call to the interface API made available by the UIDAI for this purpose.

Each data record additionally includes a set of data fields 308*d* configured for recording identity data/metadata corresponding to each individual registered with the identity verification platform. Exemplary instances of data fields that may include said set of data fields 308*d* include a data field 308*a* configured to store the registrant's name, a data field 308*b* configured to store the registrant's date of birth, a data field 308*c* configured to store the registrant's biometric data (e.g., one or more biometric templates generated based on biometric features of the registrant), and a data field 308*d* configured to store details relating to one or more payment cards corresponding to a registrant. It would be understood that the data fields described above as part of the set of data fields 308*d* are only exemplary and said set of data fields 308*d* may include any other data fields that are configured to store registrant identity data/metadata. By way of example, such other data fields may variously store passwords, personal identification numbers (PINs), or any other form of identity authentication information associated with an individual.

In an embodiment, the identity verification platform includes the UIDAI database made available by the Government of India for the purposes of its Aadhar project.

Figure 3D:
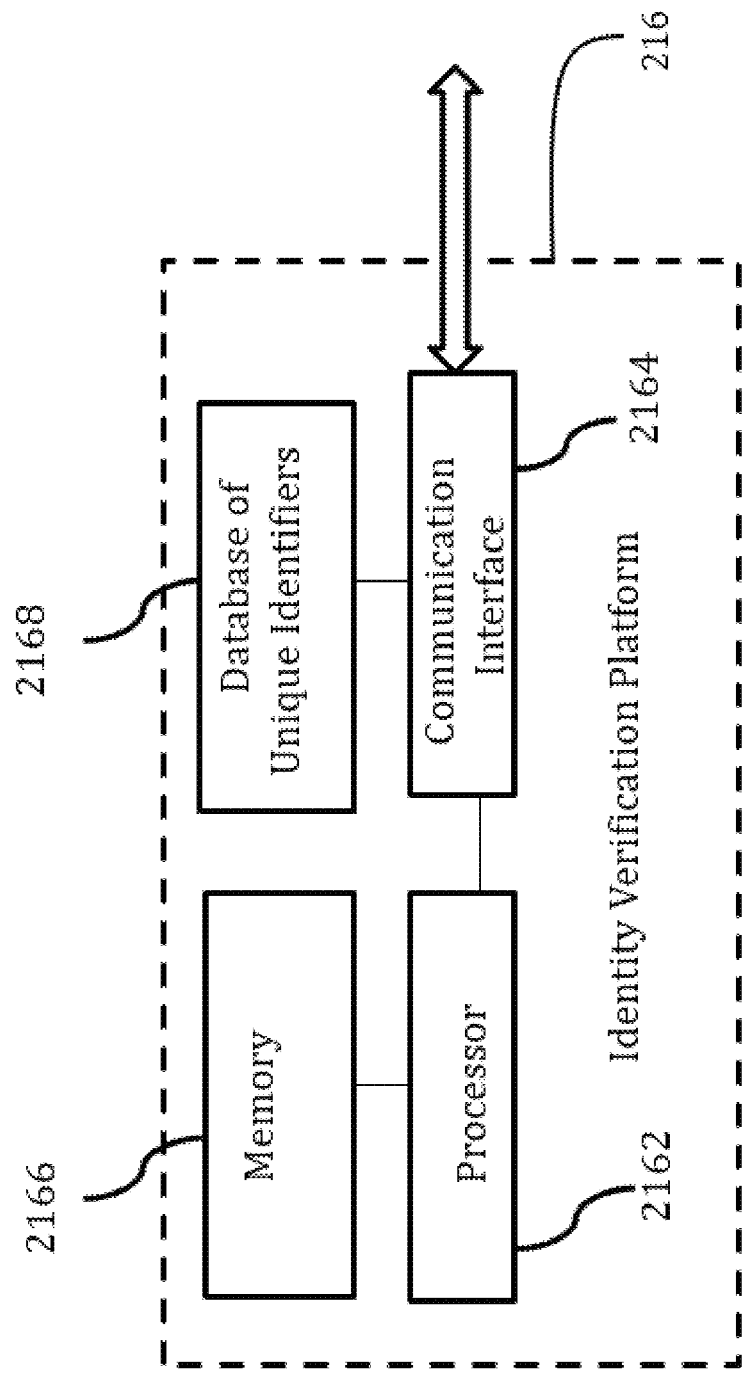
FIG. 3D is a simplified block diagram of an identity verification platform of the type illustrated in FIG. 2, in accordance with an embodiment of present disclosure.

FIG. 3D is a simplified block diagram of an exemplary embodiment of identity verification platform 216 that has been previously described more generally in connection with FIG. 2. Identity verification platform 216 of FIG. 3B includes processor 2162, memory 2166, communication interface 2164, and database 2168.

Processor 2162 may be communicably coupled with memory 2166, which memory 2166 is configured to enable storage and retrieval of processing instructions for retrieval and execution by processor 2162. Processor 2162 is additionally communicably coupled with communication interface 2164, which communication interface 2164 enables identity verification platform for network communication with any electronic device having network communication capabilities (e.g., with activation server 214).

Processor 2162 may additionally be communicably coupled to a database of unique identifiers 2168, which database includes one or more non-transient memory devices configured for storing and retrieving data, which data includes data of the type stored in activation server data records of the type discussed in connection with FIG. 3C. Database 2168 may include multiple storage units such as hard disks or sold state disks in a redundant array of inexpensive disks (RAID) configuration. Database 2168 may also include a storage area network and/or a network attached storage (NAS) system.

In some embodiments database 2168 may be integrated within identity verification platform 216 and in other embodiments may be external to said identity verification platform and may be accessed by the identity verification platform through a database interface (not shown). Said database interface may include for example, any of an Advanced Technology Attachment (ATA) adapter, a Serial ATA (SATA) adapter, a network adapter, or any other component providing processor 2162 with access to database 2168.

Database of unique identifiers 2168 is a database configured to store (i) a unique identifier corresponding to each individual whose records are maintained in said database and (ii) associated one or more further items of identity related data corresponding to said individual(s). Database of unique identifiers 2168 may include a data interface that enables external entities to query data stored in said database of unique identifiers 304. Identity verification platform 216 may in an embodiment include any server configuration having access to internal or external database storage. In an embodiment, identity verification platform 326 may include at least one processor, and one or more transitory and/or non-transitory memories.

Figure 4A:
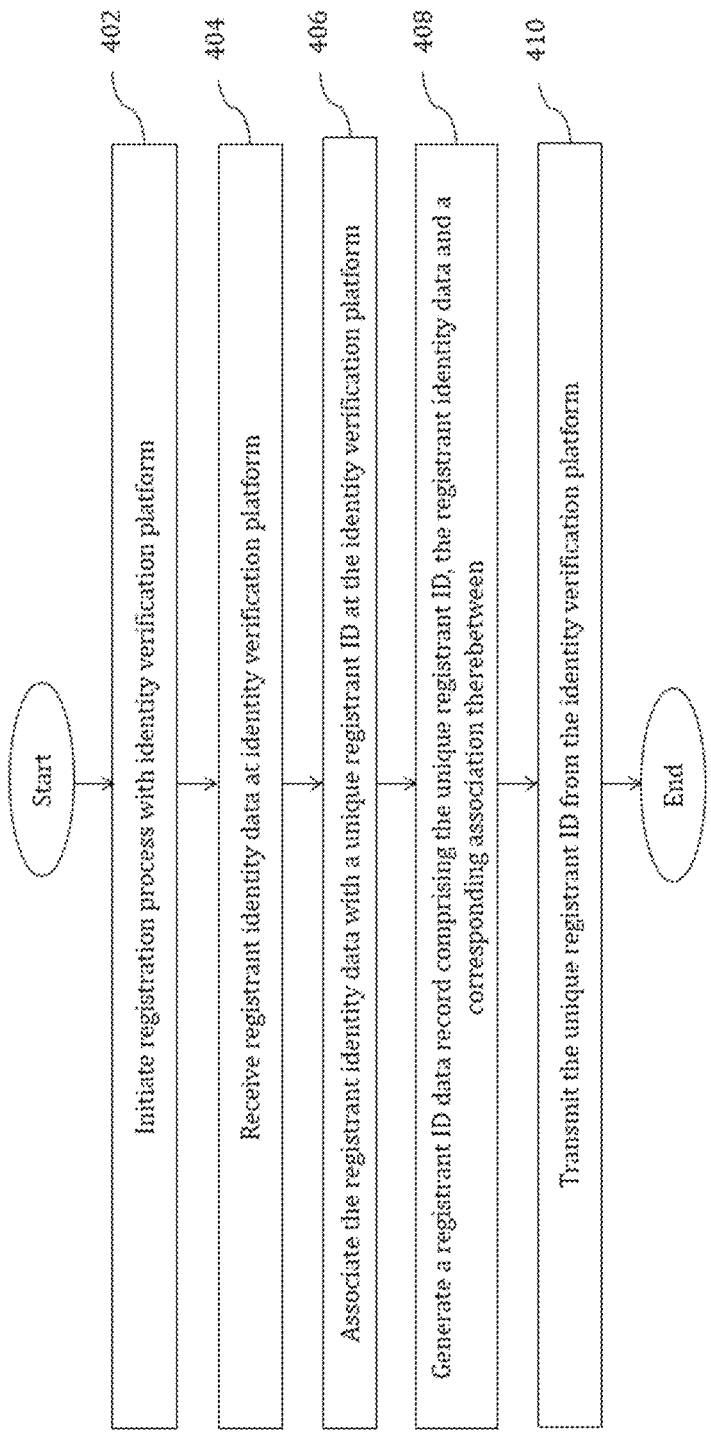
FIG. 4A is a flowchart illustrating a method for registering a user with an identity verification platform, in accordance with an embodiment of present disclosure.

FIG. 4A is a flowchart illustrating a method of registering an individual with identity verification platform 216.

Step 402 includes initiating registration of an individual with identity verification platform 216. The registration process may be initiated in any number of different ways. In one way, the registration process is initiated directly by way of operator input or user input received at identity verification platform 216. In another way, the registration process may be initiated by way of operator input or user input received at a client terminal (or at a peripheral device that is in communication with a client terminal) that is in network communication with identity verification platform 216.

Step 404 includes receiving registrant identity data/metadata corresponding to the individual being registered, at the identity verification platform. Registrant identity data/metadata may include any instances of data that are associated with the individual sought to be registered at the identity verification platform. In an embodiment, one or more items of the registrant identity data/metadata received at step 404 consists of data that is uniquely associated with the individual who is sought to be registered. Exemplary instances of registrant identity data/metadata include an individual's name, date of birth, biometric data (e.g., fingerprint, face, iris, retina, voice and/or infrared signature based biometric data), passwords, personal identification numbers (PINs) and/or payment card/account data.

Step 406 includes associating the received registrant identity data with a unique registrant ID, wherein said unique registrant ID may be generated by identity verification platform 216 or by an external server in response to a request transmitted by identity verification platform 216.

Step 408 thereafter includes generating a registrant ID data record including (i) the unique registrant ID, (ii) the received registrant identity data corresponding to the individual being registered, and (iii) an association between said unique registrant ID and the received registrant identity data.

Step 410 includes transmitting the unique registrant ID from identity verification platform 216 to the registrant. Said transmission may occur in any number of different ways, including by way of transmission to a client terminal accessed by the registrant, to a device or electronic address associated with the registrant or by way of mail or courier to a physical address associated with the individual.

Figure 4B:
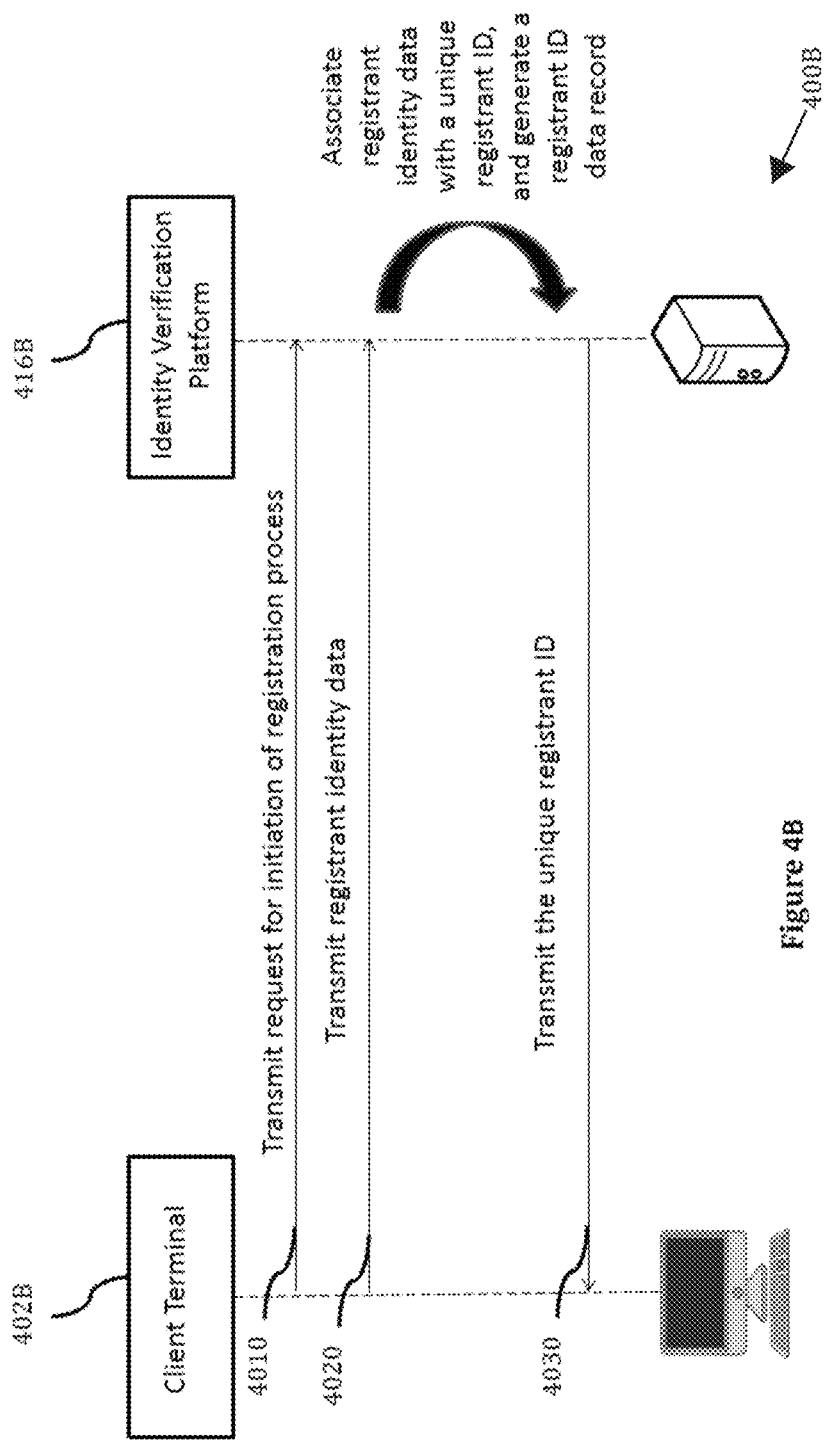
FIG. 4B is a sequence flow diagram representing the communication flow in implementing the method illustrated in FIG. 4A, in accordance with an embodiment of present disclosure.

FIG. 4B is a simplified sequence flow diagram 400B representing an exemplary embodiment of the method of registering an individual with the identity verification platform 216 that has been discussed in connection with FIG. 4A.

The sequence flow diagram 400B includes the method steps 402 to 410 of FIG. 4A but which steps have not been described again for the sake of brevity. The steps illustrated in FIG. 4B include steps 4010 to 4030 implemented between client terminal 402B and identity verification platform 416B.

At step 4010, upon initiation of the registration process with identity verification platform, client terminal 402B transmits to identity verification platform 416B a request for initiation of a registration process to register an individual with identity verification platform 416B. Step 4020 includes transmitting registrant identity data from client terminal 402B to identity verification platform 416B for the purposes of enabling identity verification platform 416B to register the individual seeking registrations through client terminal 402B. The identity verification platform 416B thereafter associates the transmitted registrant identity data with a unique registrant ID, and generates a registrant ID data record including the transmitted registrant identity data and the unique registrant ID. At step 4030, the generated unique registrant ID is transmitted to the client terminal 402B, where it can be viewed/accessed/stored by the individual who has not been registered with identity verification platform 416B.

Figure 5A:
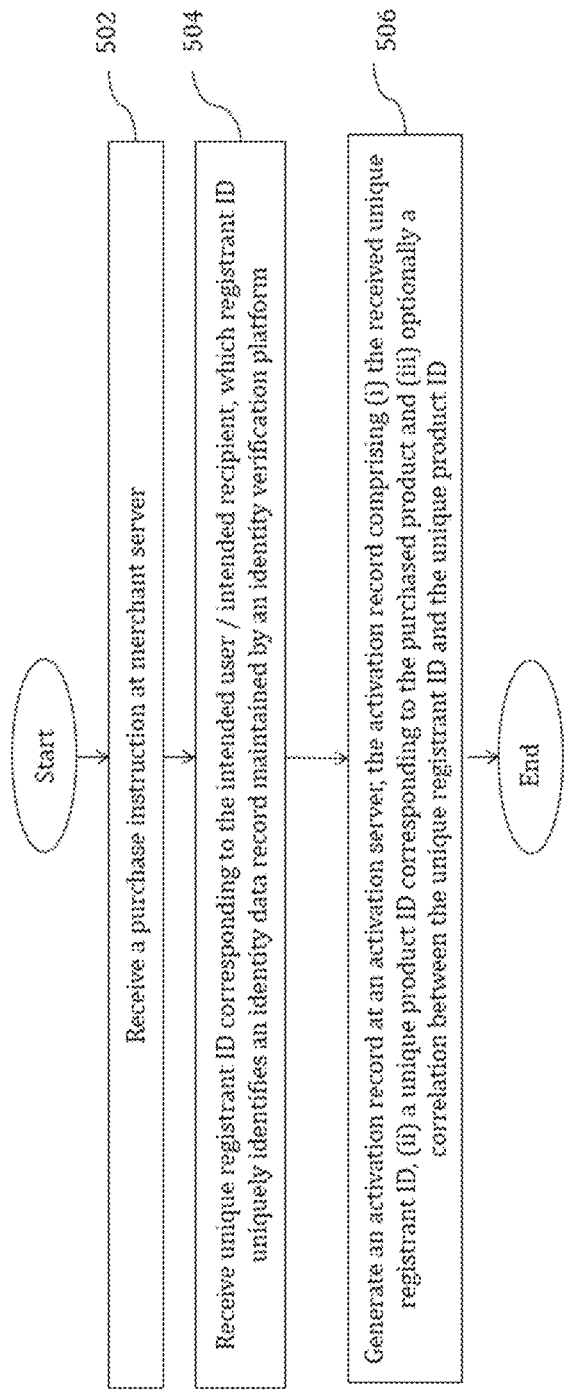
FIG. 5A illustrates a method of generating an activation data record corresponding to a purchased product, at an activation server, in accordance with an embodiment of present disclosure.

FIG. 5A illustrates a method of generating an activation data record corresponding to a purchased product, at an activation server 214 configured to operate within system 200 of FIG. 2.

Step 502 includes receiving a purchase instruction for purchase of a product at merchant sever 206. The purchase instruction may in an embodiment be received from client terminal 202 which is accessed by the purchaser. Client terminal 202 may be in network communication with merchant server 206 through communication network 204.

Step 504 includes receiving a unique registrant ID corresponding to the intended user/intended recipient, wherein said unique registrant ID is an ID that has been generated by and/or recorded at identity verification platform 216 (for example in accordance with the teachings of FIGS. 4A and 4B), and which uniquely identifies a registrant ID data record maintained by the identity verification platform 216. The unique registrant ID may be input by the purchaser at client terminal 202 and may be transmitted from client terminal 202 to merchant server 206. In an embodiment, said unique registrant ID may be submitted in response to a prompt received from merchant server 206 for identifying the intended recipient/intended user of the product under purchase, for the purposes of enabling secure product activation.

At step 506, an activation data record is generated at activation server 214, said activation data record including (i) the unique registrant ID received at step 504, (ii) a unique product ID corresponding to the product under purchase, and (iii) may be, a correlation or an association between the unique registrant ID and the unique product ID. The activation data record may be generated at activation server 214. To enable activation server 214 to generate the activation data record, merchant server 206 may transmit the unique registrant ID and the unique product ID to activation server 214. Said activation server 214 may store the generated activation data record in a database accessible by the activation server.

It would be understood that subsequent to generation of the activation data record, the product purchase process may be completed and the purchased product (previously the product under purchase) may be dispatched for delivery to a delivery address specified by the purchaser during the purchase workflow.

Figure 5B:
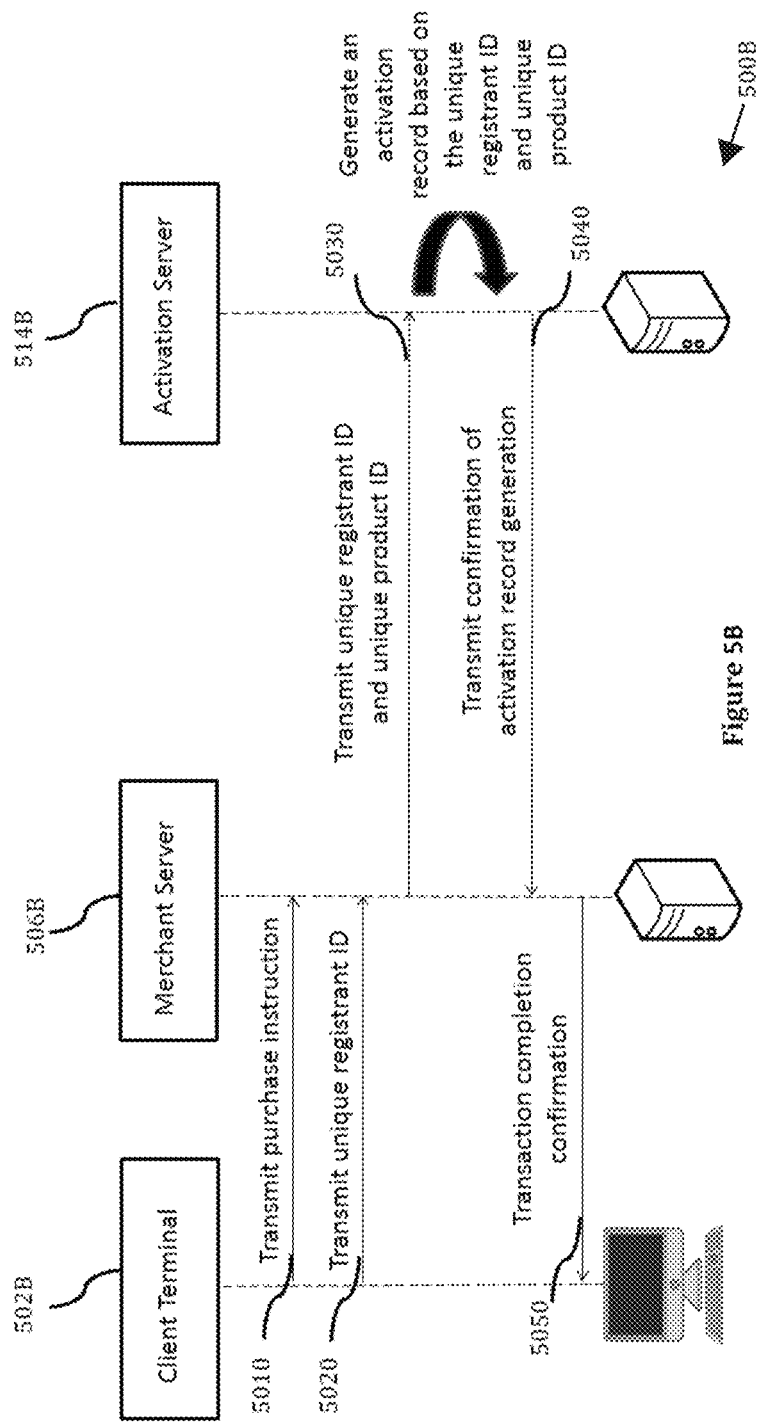
FIG. 5B is a sequence flow diagram representing the communication flow in implementing the method illustrated in FIG. 5A, in accordance with an embodiment of present disclosure.

FIG. 5B is a simplified sequence flow diagram 500B representing an exemplary embodiment of the method of generating an activation data record corresponding to a purchased product, through an activation server 214, that has been discussed in connection with FIG. 5A.

The sequence flow diagram 500B includes the method steps 502 to 506 of FIG. 5A but which steps have not been described again for the sake of brevity. Steps 5010 to 5050 are carried out between client terminal 502B, merchant server 506B, and activation server 514B.

At step 5010, client terminal 502B transmits a product purchase instruction to merchant server 506B. Step 5020 includes client terminal 502B further transmitting a unique registrant ID associated with the intended recipient of the purchased product to merchant server 506B.

At step 5030, responsive to the product purchase workflow having been satisfactorily concluded, merchant server 506B transits the received unique registrant ID (corresponding to the intended recipient of the purchased product) and a unique product ID corresponding to the purchased product to activation server 514B.

Thereafter activation server 514B generates an activation record based on the unique registrant ID and the unique product ID received from merchant server 506B. Subsequent to generation of said activation record, step 5040 includes transmission of confirmation of the activation record generation from activation server 514B to merchant server 506B.

Responsive to receiving confirmation of activation record generation at merchant server 506B, step 5050 includes transmitting from merchant server 506B to client terminal 502B, confirmation of completion of the purchase transaction.

Figure 6A:
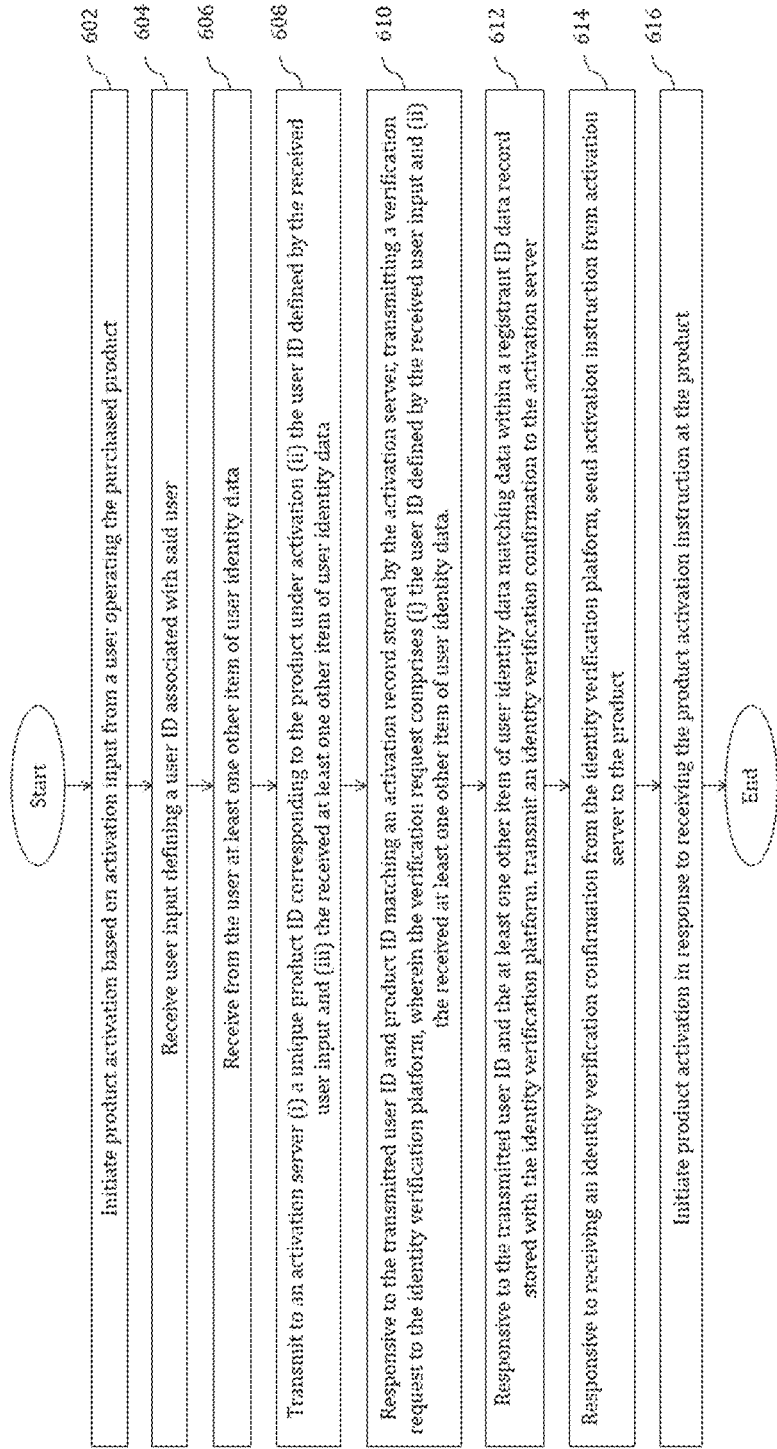
FIG. 6A illustrates a method of product activation involving a product that has been purchased from an online merchant and which has been delivered to a user, in accordance with an embodiment of present disclosure.

FIG. 6A illustrates a method of product activation involving a product that has been purchased in accordance with the method of FIG. 5A. The method of FIG. 6 commences subsequent to delivery of purchased product 218.

Step 602 includes initiating product activation of purchased product 218, in response to receiving an activation input from a user operating purchased product 218. The activation input may include any user generated or environmental input that product 218 is configured to interpret as a signal for initiating a product activation process or a product activation subroutine. Depending on the configuration of product 218, the activation input may include any of (i) the product being switched on, or (ii) receiving any other user input, signaling an instruction for initiating a product activation process or product activation subroutine.

Step 604 includes receiving at purchased product 218, a user input defining a user ID associated with the user operating said purchased product. The user input may be received through a user interface provided at purchased product 218, and may be input in response to a prompt provided through the user interface. In an embodiment, the user ID may be an ID of the same ID type as the unique registrant IDs that are generated and maintained by identity verification platform 216.

Step 606 includes receiving from the user (through purchased product 218, or a peripheral device connected to purchased product 218) at least one additional item of user identity data. In an embodiment, the user may be prompted to input the one other item of user identity data through a user interface implemented within purchased product 218. In a specific embodiment, the at least one other item of user identity data may include identity data of a type that is stored within registrant ID data records maintained by identity verification platform 216. In an embodiment, the at least one other item of identity data may include any one or more of the user's name, data of birth, data representing one or more biometric features of the user, data representing one or more payment cards associated with the user, passwords, personal identification numbers (PINs), or any other form of identity authentication information.

Step 608 includes transmitting to activation server 214, (i) a unique product ID corresponding to purchased product 218, (ii) the user ID defined by the user input received at step 604, and (iii) the at least one other item of user identity data received at step 606. The unique product ID corresponding to purchased product 218 includes the same unique product ID that was used to create an activation data record (in accordance with the method of FIG. 5A) at the time of purchase of product 218. The data transmitted to activation server 214 at step 608 may be transmitted from purchased product 218 to activation server 214 through communication network 204.

Step 610 includes responding to a determination that the transmitted user ID and product ID (that are transmitted at step 608) match an activation data record stored at activation server 214 (i.e., match a registrant ID and a product ID included within an activation data record maintained by activation server 214), by transmitting a verification request to identity verification platform 216, wherein the verification request includes (i) the user ID defined by the received user input (received at step 604) and (ii) the received at least one other item of user identity data (received at step 608). Said verification request may in an embodiment be transmitted from activation server 214 to identity verification platform 216.

At step 612, responsive to the transmitted user ID and the transmitted at least one other item of user identity data matching a registrant ID data record that has been generated and stored at identity verification platform 216 (for example in accordance with the teachings of FIGS. 4A and 4B), identity verification platform 216 transmits an identity verification confirmation message to activation server 214.

At step 614, in response to activation server 214 receiving an identity verification confirmation message from identity verification platform 216, activation server 214 transmits an activation instruction to purchased product 218.

Step 616 includes initiation of a product activation process or product activation subroutine at purchased product 218, in response to receiving a product activation instruction from activation sever 214.

By implementing the method of FIG. 6A, the combination of activation server 214 and identity verification platform 216 can verify that delivered product 218 has been delivered to the intended recipient/intended user whose identity was specified at the time of purchase of said product 218.

In the event the product is stolen, misappropriated, or otherwise misdelivered, and the activation process is triggered by an individual other than the recipient/user whose identity was specified at the time of purchase of product 218, such person would either be unable to provide the correct unique registrant ID (that was provided at the time of the product purchase and that has been associated with the unique product ID in the relevant activation data record corresponding to purchased product 218 that is maintained at activation server 214) or even if such person is able to provide the correct unique registrant ID, he would be unable to provide the at least one other item of identity data that is associated with such unique registrant ID in the corresponding registrant ID data record maintained at identity verification platform 216.

It would be understood that selection of an appropriate item of identity data for the identity verification process is of critical importance to the level of security implemented through this disclosure. For example, the use of biometric data as the at least one other item of identity data that a user requires to submit for identity verification would make it exceptionally difficult for an unauthorized person to spoof or replicate the identity of the intended recipient/intended user of the purchased product, even if such unauthorized person has somehow gained access to unique registrant ID of the intended recipient/intended user of the purchased product.

Figure 6B:
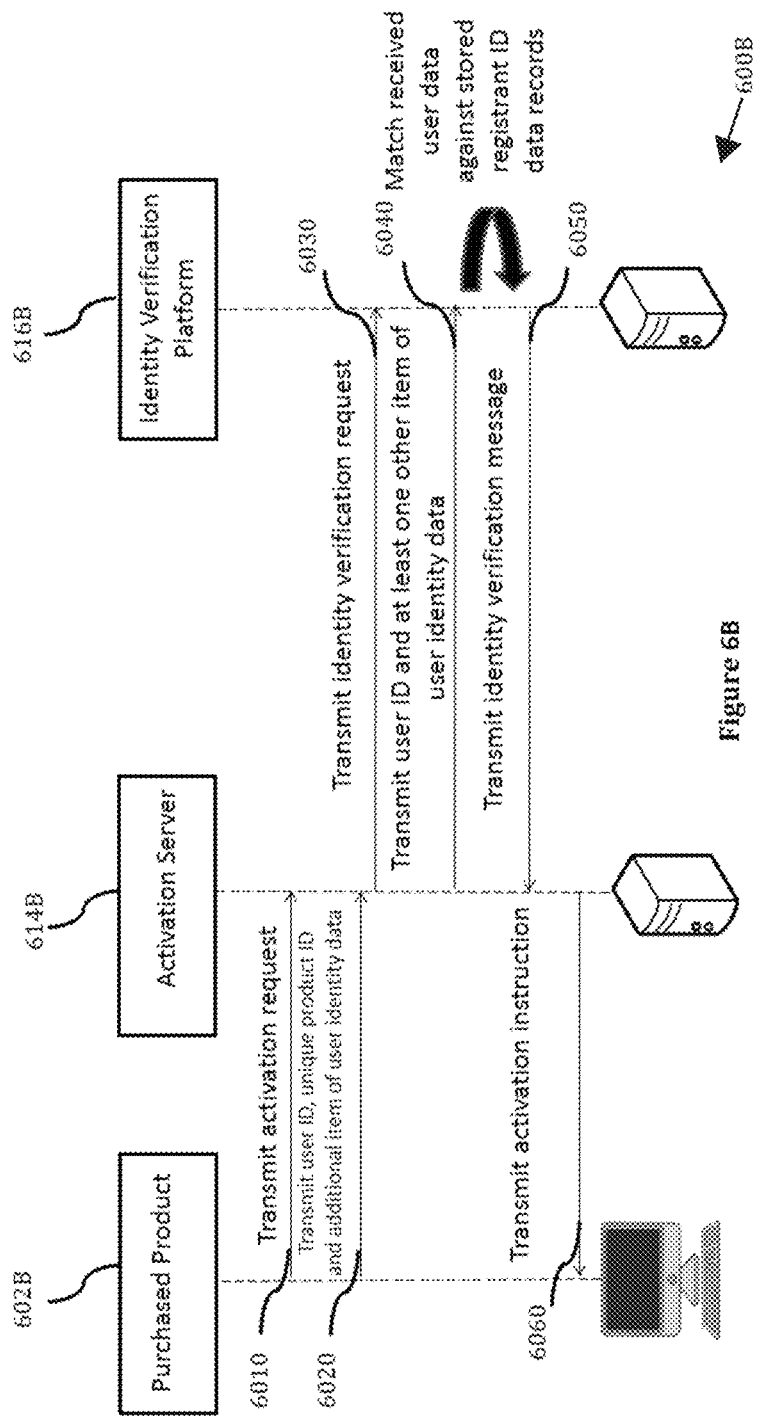
FIG. 6B is a sequence flow diagram representing the communication flow in implementing the method illustrated in FIG. 6A, in accordance with an embodiment of present disclosure.

FIG. 6B is a simplified sequence flow diagram 600B representing an exemplary embodiment of the method of product activation, that has been discussed in connection with FIG. 6A.

The sequence flow diagram 600B includes the method steps 602 to 616 of FIG. 6A but which steps have not been described again for the sake of brevity. Steps 6010 to 6060 are carried out between client terminal 602B, activation server 614B, and identity verification platform 616B.

At step 6010, purchased product 602B (which is a purchased product capable of network communication) transmits a product activation request to activation server 614B. Step 6020 thereafter includes transmitting from purchased product 602B to activation server 614B, a user ID, a unique product ID associated with the product under activation, and at least one other item of user identity data.

At step 6030, and in response to determining that the transmitted user ID and product ID match an activation record stored by the activation server, activation server 614B transmits an identity verification request to identity verification platform 616B. Step 6040 includes additionally transmitting from activation server 614B to identity verification platform 616B, the user ID and the at least one other item of user identity data that have been received from purchased product 602B (at step 6020).

Identity verification platform 616B thereafter matches the received user data (including the received user ID and the at least one other item of user identity data) against stored registrant ID data records that have been generated and/or are maintained by identity verification platform 616B. Responsive to the transmitted user ID and the at least one other item of user identity data matching data within a registrant ID data record stored with or by identity verification platform 616B, step 6050 includes transmitting an identity verification message to activation server 614B, said identity verification message may in an embodiment confirm that the user identity information received from purchased product 602B corresponds to an individual that has been registered with identity verification platform 616B and to whom the user ID received at step 6010 properly corresponds.

Responsive to receiving the identity verification message at step 6050, activation server 614B thereafter transmits at step 6060, a product activation instruction to the purchased product 602B.

Figure 7:
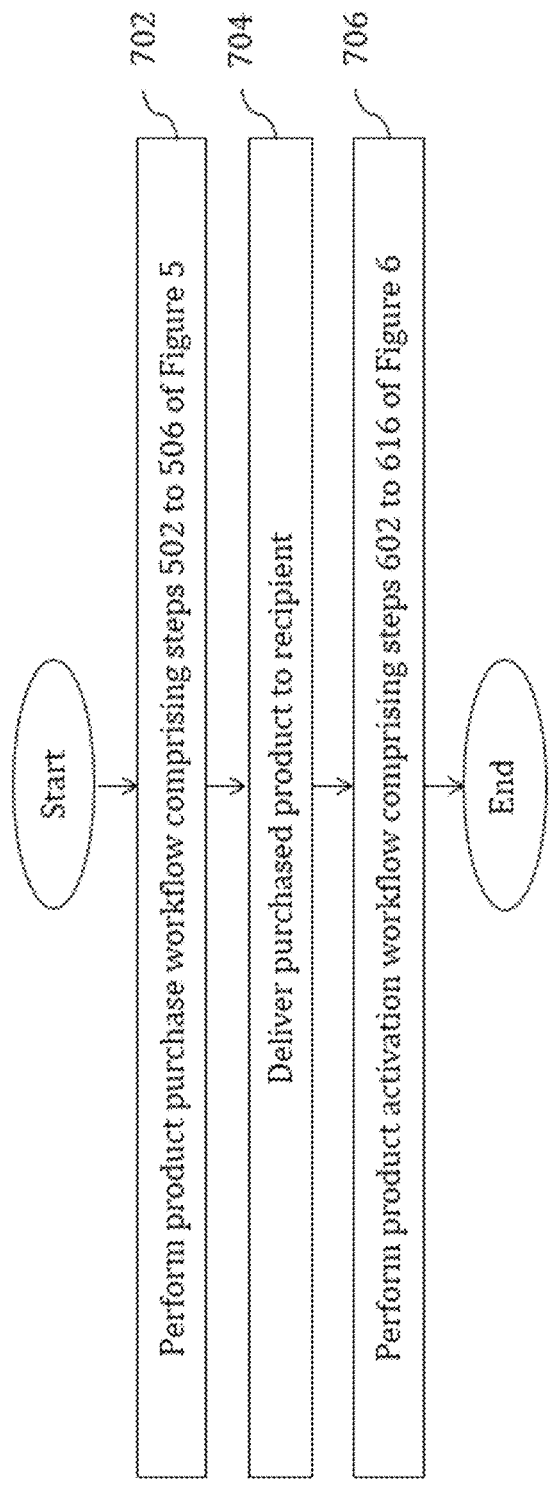
FIG. 7 illustrates a consolidated method of product purchase, product delivery, and product activation involving the methods described in connection with FIGS. 5 and 6, in accordance with an embodiment of present disclosure.

FIG. 7 briefly illustrates a workflow combining the method steps of FIGS. 5A and 6A including the steps of product purchase through a merchant server, and subsequent post-delivery activation of the purchased product.

Step 702 includes performing a product purchase workflow as described above in connection with steps 502 to 506 of FIG. 5A. Step 704 thereafter includes delivering the purchased product. Step 706 includes performing a product activation workflow as described above in connection with steps 602 to 616 of FIG. 6A.

Figure 8:
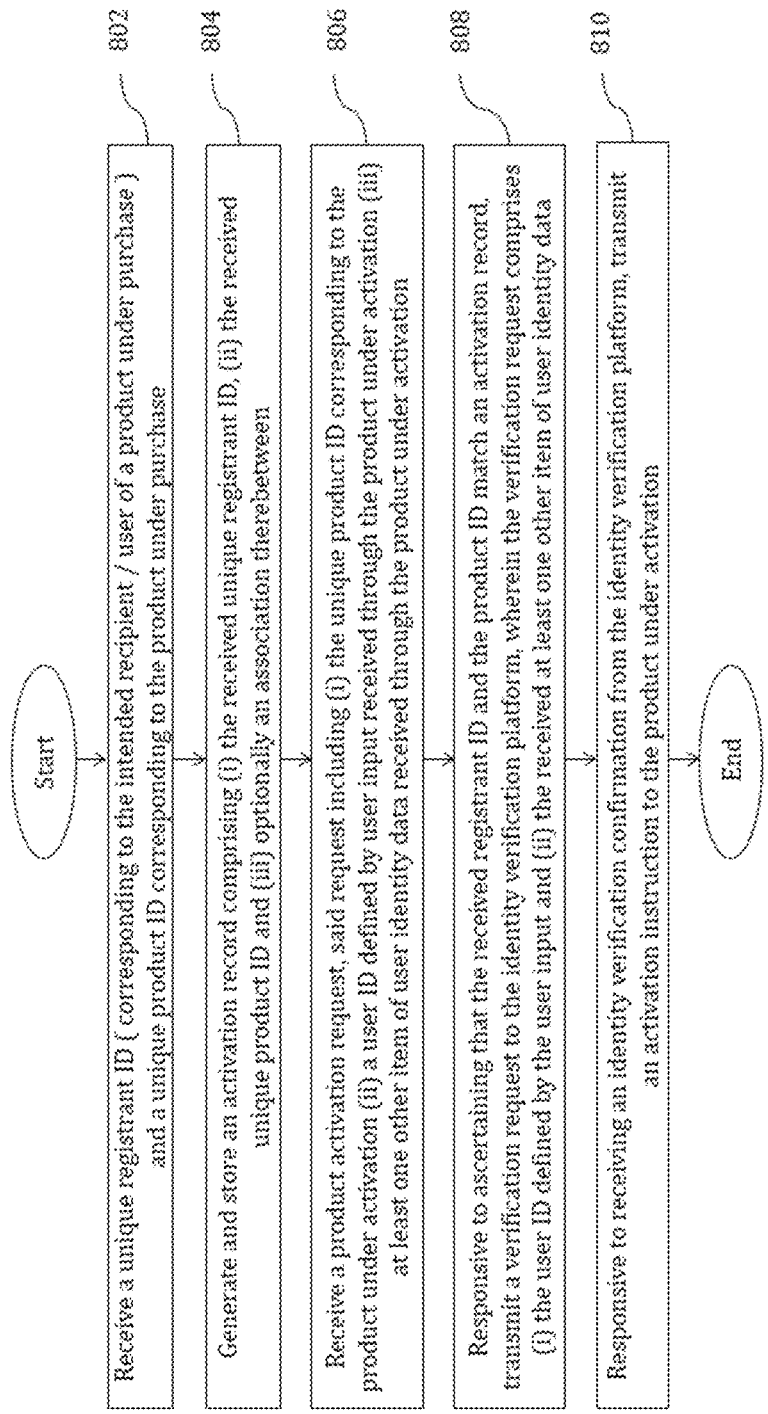
FIG. 8 illustrates a method of product activation, as implemented at an activation server, in accordance with an embodiment of present disclosure.

FIG. 8 illustrates a method of product activation in accordance with the teachings of the present disclosure, as implemented through an activation server.

Step 802 occurs at the time of product purchase through a merchant server 206, and includes receiving at activation server 214 (i) a unique registrant ID corresponding to the intended recipient/intended user of the product under purchase (ii) a unique product ID corresponding to the product under purchase. Said unique registrant ID and unique product ID may be transmitted to activation server 214 from merchant server 206 through communication network 204. In an embodiment, the unique registrant ID is an ID of the same ID type as unique registrant IDs that are generated and maintained by identity verification platform 216.

Step 804 includes activation server 214 generating and storing an activation data record including (i) the received unique registrant ID, (ii) the received unique product ID, and (iii) may be, an association between (i) and (ii).

Step 806 is performed subsequent to delivery of purchased product 218, and includes receiving a product activation request at activation server 214. Said product activation request may be transmitted from purchased product 218 to activation server 214 through communication network 204. The received product activation request may include (i) a unique product ID corresponding to purchased product 218 (i.e., the product under activation), (ii) a user ID defined by user input received through product under activation 218, and (iii) at least one other item of user identity data received through product under activation 218. The user ID and the at least one other item of user identity data may correspond respectively to data types that are implemented by identity verification platform 216 for the purpose of generating registrant ID data records (for example in accordance with the teachings of FIGS. 4A and 4B).

Step 808 includes responding to a determination that the user ID and the unique product ID received from the product under activation 218 match an activation data record (i.e., a unique registrant ID and a unique product ID that are associated with each other within an activation data record) that has been previously generated and stored by activation server 214 by transmitting a verification request to identity verification platform 216, wherein said verification request includes (i) the user ID defined by the user input and that has been received by activation server 214 at step 806, and (ii) the at least one other item of user identity data that has been received at step 806.

Step 810 thereafter includes responding to receiving an identity verification confirmation from identity verification platform 216, by transmitting an activation instruction from activation server 214 to the product under activation.

While not illustrated specifically in FIG. 8, it would be understood that the determination whether an identity verification confirmation is transmitted from identity verification platform 216 to activation server 214 may be implemented in accordance with the teachings of method step 612 of FIG. 6A.

Figure 9:
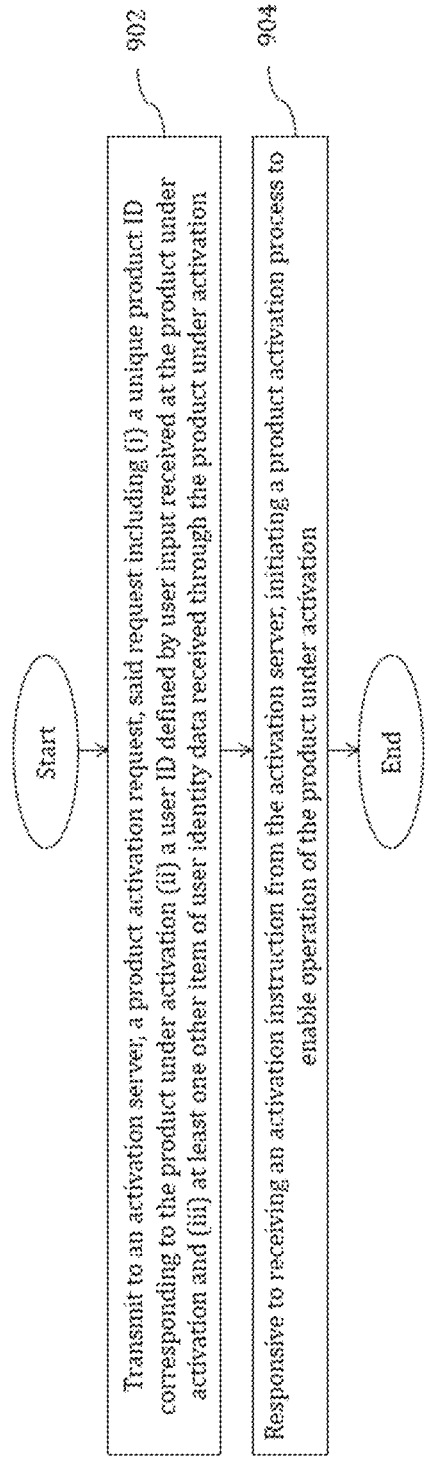
FIG. 9 illustrates a method of product activation, as implemented at the product-under-activation, in accordance with an embodiment of present disclosure.

FIG. 9 illustrates a method of product activation in accordance with the teachings of the present disclosure, as implemented at purchased product 218.

Step 902 of FIG. 9 includes transmitting from purchased product 218 to activation server 214, a product activation request, said request including (i) a unique product ID corresponding to purchased product 218 (i.e. the product under activation), (ii) a user ID defined by user input received through the product under activation 218 and (iii) at least one other item of user identity data received through the product under activation 218. The user ID and the at least one other item of user identity data may correspond respectively to data types that are implemented by identity verification platform 216 for the purpose of generating registrant ID data records (for example in accordance with the teachings of FIGS. 4A and 4B).

While not specifically illustrated in FIG. 9, it would be understood that activation server 214 may be configured according to the teachings of FIGS. 6A, 6B, and/or 8 described above.

Thereafter, at step 904, responsive to receiving (at product under activation 218) an activation instruction from activation server 214, a product activation process or product activation subroutine is initiated at purchased product 218 for enabling operation of product under activation 218.

The disclosure additionally provides computer program products for implementing one or more of the methods described above.

In an embodiment, the disclosure provides a computer program product for identity based product activation of a product purchased at a merchant server, wherein purchase of said product includes the steps of (i) receiving at the merchant server, (a) an instruction for purchase of the product, and (b) a unique registrant ID corresponding to an intended user of the product, wherein said unique registrant ID uniquely identifies an identity data record maintained by an identity verification platform and corresponding to the intended user of the product, and (ii) generating an activation data record at an activation server, said activation data record including the received unique registrant ID, and a unique product ID corresponding to the product.

The computer program product includes a non-transitory computer usable medium having computer readable program code embodied therein, the computer readable program code including instructions for (i) receiving at the activation server, data communicated from the product, wherein the received data includes (a) the unique product ID corresponding to the product, (b) a user ID corresponding to a user operating the product, wherein said user ID is defined by user input received through the product, and (c) at least one additional item of user identity data corresponding to said user, (ii) responsive to determining that the user ID and the unique product ID respectively match a unique registrant ID and a unique product ID that have been associated with each other within an activation data record generated by the activation server, transmitting a verification request to the identity verification platform, said verification request including the user ID and the received at least one additional item of user identity data, and (iii) responsive to receiving an identity confirmation at the activation server, transmitting a product activation instruction from the activation server to the product, wherein an identity confirmation is received at the activation server in response to a determination that the user ID and the at least one additional item of user identity data respectively match a registrant ID and an item of user identity data that have been associated with each other in an identity data record maintained by the identity verification platform.

Figure 10:
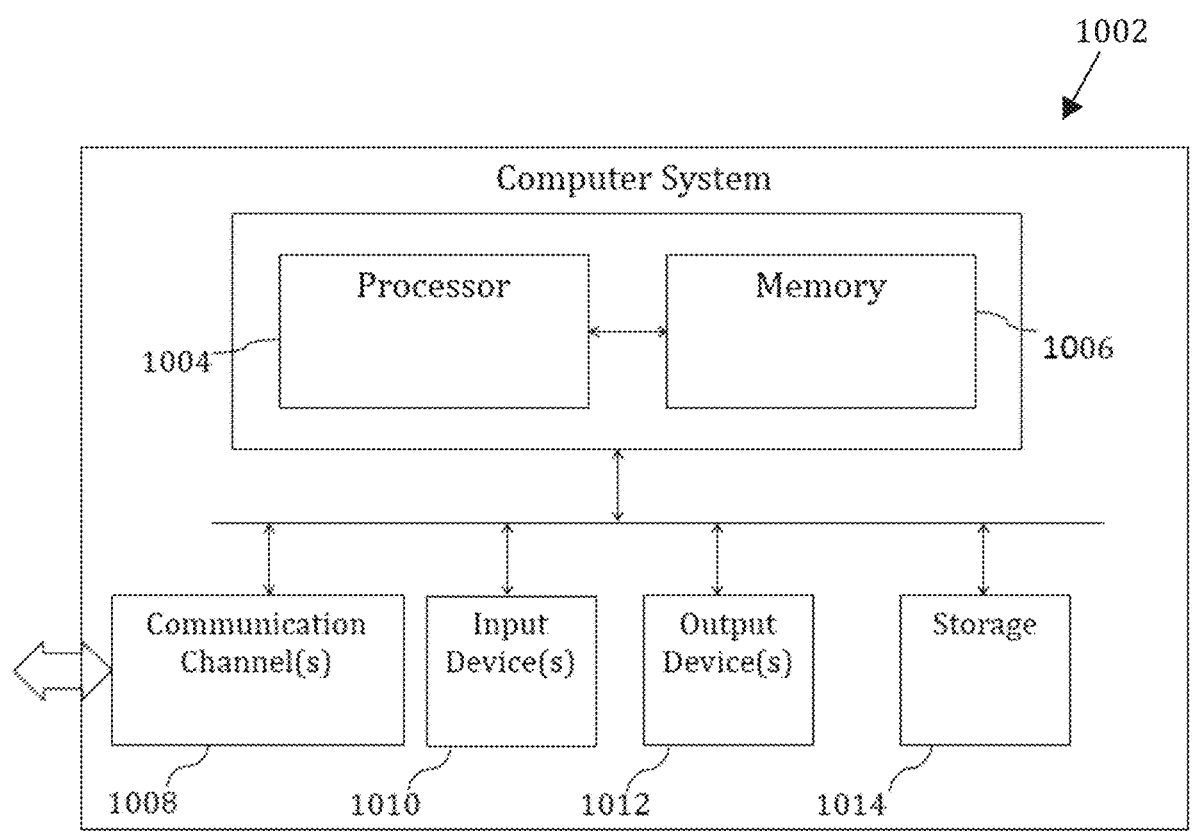
FIG. 10 illustrates an exemplary computer system according to which various embodiments of the present disclosure may be implemented.

FIG. 10 illustrates an exemplary computer system 1002 for implementing the present disclosure.

The illustrated system includes computer system 1002 which in turn includes one or more processors 1004 and at least one memory 1006. Processor 1004 is configured to execute program instructions and may be a real processor or a virtual processor. It will be understood that computer system 1002 does not suggest any limitation as to scope of use or functionality of described embodiments. The computer system 1002 may include, but is not be limited to, one or more of a general-purpose computer, a programmed microprocessor, a micro-controller, an integrated circuit, and other devices or arrangements of devices that are capable of implementing the steps that constitute the method of the present disclosure. Exemplary embodiments of a computer system 1002 in accordance with the present disclosure may include one or more servers, desktops, laptops, tablets, smart phones, mobile phones, mobile communication devices, tablets, phablets, and personal digital assistants. In an embodiment of the present disclosure, the memory 1006 may store software for implementing various embodiments of the present disclosure. The computer system 1002 may have additional components. For example, the computer system 1002 may include one or more communication channels 1008, one or more input devices 1010, one or more output devices 1012, and storage 1014. An interconnection mechanism (not shown) such as a bus, controller, or network, interconnects the components of the computer system 1002. In various embodiments of the present disclosure, operating system software (not shown) provides an operating environment for various softwares executing in the computer system 1002 using a processor 1004, and manages different functionalities of the components of the computer system 1002.

The communication channel(s) 1008 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth, or other transmission media.

The input device(s) 1010 may include, but is not limited to, a touch screen, a keyboard, mouse, pen, joystick, trackball, a voice device, a scanning device, or any another device that is capable of providing input to the computer system 1002. In an embodiment of the present disclosure, the input device(s) 1010 may be a sound card or similar device that accepts audio input in analog or digital form. The output device(s) 1012 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1002.

The storage 1014 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present disclosure, the storage 1014 may contain program instructions for implementing any of the described embodiments.

In an embodiment of the present disclosure, the computer system 1002 is part of a distributed network or a part of a set of available cloud resources.

The present disclosure may be implemented in numerous ways including as a system, a method, or a computer program product such as a computer readable storage medium or a computer network wherein programming instructions are communicated from a remote location.

The present disclosure may suitably be embodied as a computer program product for use with the computer system 1002. The method described herein is typically implemented as a computer program product, including a set of program instructions that is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the disclosure as a computer program product may be in an intangible form using wireless techniques, including but not limited to microwave, infrared, Bluetooth, or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present disclosure significantly reduces the likelihood of a purchased product that has been stolen or misdelivered being used by any unauthorized party, for the reason that only the intended recipient/intended user of the product would be able to successfully activate the purchased product.

While the exemplary embodiments of the present disclosure are described and illustrated herein, it will be appreciated that they are merely illustrative. It will be understood by those skilled in the art that various modifications in form and detail may be made therein without departing from or offending the spirit and scope of the disclosure as defined by the appended claims. Additionally, the disclosure illustratively disclose herein suitably may be practiced in the absence of any element which is not specifically disclosed herein and in a particular embodiment that is specifically contemplated, the disclosure is intended to be practiced in the absence of any one or more element which are not specifically disclosed herein.

What is claimed is:

1. A method for identity based product activation, the method comprising:
   receiving at a merchant server, (i) an instruction for purchase of a product that includes a computing device, and (ii) a unique registrant ID corresponding to an intended user of the product, wherein said unique registrant ID uniquely identifies an identity data record maintained by an identity verification platform and corresponding to the intended user of the product, the identity data record including an item of user identity data associated with the unique registrant ID;
   generating an activation data record at an activation server, said activation data record comprising the received unique registrant ID, and a unique product ID corresponding to the product;
   responsive to receiving an activation input through the product:
      receiving, at the product, user input defining a user ID corresponding to a user operating the product;
      receiving, at the product, at least one additional item of user identity data corresponding to said user;
      transmitting, from the product to the activation server, the unique product ID corresponding to the product, the user ID, and the at least one additional item of user identity data;
      determining that the user ID and the unique product ID received from the product respectively match the unique registrant ID and the unique product ID that have been associated with each other within the activation data record generated by the activation server; and
      transmitting, responsive to the determination that the user ID and the unique product ID received from the product respectively match the unique registrant ID and the unique product ID that have been associated with each other within the activation data record generated by the activation server, a verification request from the activation server to the identity verification platform, said verification request comprising the user ID and the received at least one additional item of user identity data;
   determining that the user ID and the received at leas tone additional item of user identity data included in the verification request respectively match the unique registrant ID and the item of user identity data that have been associated with each other in the identity data record maintained by the identity verification platform;
   responsive to determining that the user ID and the at leas tone additional item of user identity data respectively match the unique registrant ID and the item of user identity data that have been associated with each other in the identity data record maintained by the identity verification platform, transmitting an identity confirmation to the activation server; and
   responsive to receiving identity confirmation at the activation server, transmitting a product activation instruction from the activation server to the product, wherein the product activation instruction changes a state of the product from an inoperable or partially operable state to an operable or fully operable state.

2. The method for identity based product activation according to claim 1, wherein the at least one additional item of user identity data comprises data corresponding to at least one of a name, a date of birth, biometric data, a password, a personal identification number, and payment card data.

3. The method for identity based product activation according to claim 1, wherein the identity verification platform is configured to associate each unique registrant ID that is maintained by said identity verification platform with at least one item of biometric data corresponding to an individual with whom said unique registrant ID is associated.

4. The method for identity based product activation according to claim 1, wherein the instruction for purchase of the product is generated by a first individual and the intended user of the product is a second individual different from the first individual.

5. The method according to claim 1, wherein the product is a physical product that is physically delivered to the intended user subsequent to purchase and prior to receiving the activation input through said product.

6. The method according to claim 1, wherein:
the unique registrant ID is an aadhar number issued under Unique Identification Authority of India;
the at least one other item of user identity data is payment card data; and
the purchased product is a mobile communication device.

7. A system for identity based product activation, the system comprising:
a merchant server comprising a processor configured for receiving through a communication interface (i) an instruction for purchase of a product that includes a computing device, and (ii) a unique registrant ID corresponding to an intended user of the product, wherein s aid unique registrant ID uniquely identifies an identity data record maintained by an identity verification platform and corresponding to the intended user of the product, the identity data record including an item of user identity data associated with the unique registrant ID; and
an activation server comprising:
a processor configured for generating an activation data record, said activation data record comprising the received unique registrant ID, and a unique product ID corresponding to the product;
a communication interface configured for:
receiving data communicated from the product, wherein the received data comprises:
the unique product ID corresponding to the product;
a user ID corresponding to a user operating the product, wherein said user ID is defined by user input received through the product; and
at least one additional item of user identity data corresponding to said user;
determining that the user ID and the unique product ID received from the product respectively match the unique registrant ID and the unique product ID that have been associated with each other within the activation data record generated by the activation server;
transmitting, responsive to the determination that the user ID and the unique product ID received from the product respectively match the unique registrant ID and the unique product ID that have been associated with each other within the activation data record generated by the activation server, a verification request from the activation server to the identity verification platform, said verification request comprising the user ID and the received at least one additional item of user identity data; and
receiving an identity confirmation from the identify verification platform;
responsive to receiving the identity confirmation at the activation server, transmitting a product activation instruction from the activation server to the product, wherein an identity confirmation is received at the activation server in response to a determination that the user ID and the at least one additional item of user identity data respectively match the registrant ID and the item of user identity data that have been associated with each other in the identity data record maintained by the identity verification platform, and wherein the product activation instruction changes a state of the product from an inoperable or partially operable state to an operable or fully operable state.

8. The system according to claim 7, wherein the at least one additional item of user identity data comprises data corresponding to at least one of a name, date of birth, biometric data, a password, a personal identification number, and payment card data.

9. The system according to claim 7, wherein the identity verification platform is configured to associate each unique registrant ID that is maintained by said identity verification platform with at least one item of biometric data corresponding to an individual with whom said unique registrant ID is associated.

10. The system according to claim 7, wherein the instruction for purchase of the product is generated by a first individual and the intended user of the product is a second individual different from the first individual.

11. The system according to claim 7, wherein the product is a physical product that is physically delivered to the intended user subsequent to purchase and prior to receiving the activation input through said product.

12. The system according to claim 7, wherein:
the unique registrant ID is an aadhar number issued under Unique Identification Authority of India;
the at least one other item of user identity data is payment card data; and
the purchased product is a mobile communication device.

13. An activation server configured for identity based product activation of a product purchased at a merchant server and including a computing device, wherein purchase of said product includes the steps of (i) receiving at the merchant server, (a) an instruction for purchase of the product, and (b) a unique registrant ID corresponding to an intended user of the product, wherein said unique registrant ID uniquely identifies an identity data record maintained by an identity verification platform and corresponding to the intended user of the product, the identity data record including an item of user identity data associated with the unique registrant ID, and (ii) generating an activation data record at the activation server, said activation data record comprising the received unique registrant ID, and a unique product ID corresponding to the product, the activation server comprising at least one processor configured for:
receiving data communicated from the product, wherein the received data comprises:
the unique product ID corresponding to the product;
a user ID corresponding to a user operating the product, wherein said user ID is defined by user input received through the product; and
at least one additional item of user identity data corresponding to said user;
determining that the user ID and the unique product ID received from the product respectively match the unique registrant ID and the unique product ID that have been associated with each other within the activation data record generated by the activation server;

transmitting, responsive to the determination that the user ID and the unique product ID received from the product respectively match the unique registrant ID and the unique product ID that have been associated with each other within the activation data record generated by the activation server, a verification request from the activation server to the identity verification platform, said verification request comprising the user ID and the received at least one additional item of user identity data;

receiving an identity confirmation from the identify verification platform; and responsive to receiving the identity confirmation, transmitting a product activation instruction from the activation server to the product, wherein an identity confirmation is received at the processor in response to a determination that the user ID and the at least one additional item of user identity data respectively match the registrant ID and the item of user identity data that have been associated with each other in the identity data record maintained by the identity verification platform, and wherein the product activation instruction changes a state of the product from an inoperable or partially operable state to an operable or fully operable state.

14. The activation server according to claim 13, wherein the at least one additional item of user identity data comprises data corresponding to at least one of a name, date of birth, biometric data, a password, a personal identification number, and payment card data.

15. The activation server according to claim 13, wherein the identity verification platform is configured to associate each unique registrant ID that is maintained by said identity verification platform with at least one item of biometric data corresponding to an individual with whom said unique registrant ID is associated.

16. The activation server according to claim 13, wherein the instruction for purchase of the product is generated by a first individual and the intended user of the product is a second individual different from the first individual.

17. The activation server according to claim 13, wherein the product is a physical product that is physically delivered to the intended user subsequent to purchase and prior to receiving the activation input through said product.

\* \* \* \* \*